Figure 1:
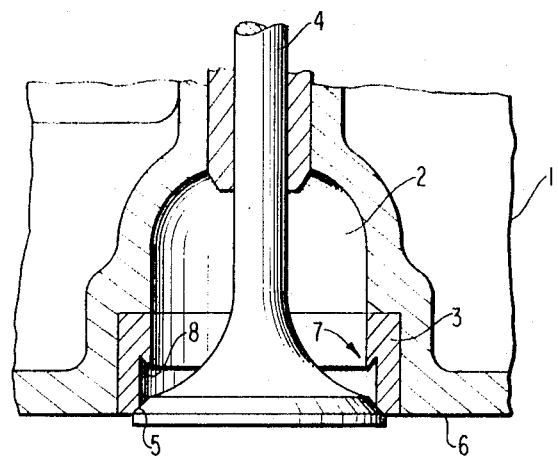

United States Patent

Scherenberg

[15] 3,653,368

[45] Apr. 4, 1972

[54] VALVE CHAMBER FOR THE INLET VALVE OF A FOUR-CYCLE INTERNAL COMBUSTION ENGINE

[72] Inventor: Hans O. Scherenberg, Stuttgart-Heumaden, Germany

[73] Assignee: Daimler-Benz Aktiengesellschaft, Stuttgart-Unterturkheim, Germany

[22] Filed: Dec. 12, 1969

[21] Appl. No.: 884,537

[30] Foreign Application Priority Data

Dec. 14, 1968 Germany .................. P 18 14 694.6

[52] U.S. Cl. .............. 123/188 S, 123/188 AF, 123/188 M
[51] Int. Cl. ........................................................ F01l 3/00
[58] Field of Search ............. 123/188 S, 188 M, 188 AF, 188, 123/131, 141; 261/DIG. 55

[56] References Cited

UNITED STATES PATENTS

| 1,147,644 | 7/1915 | Reichenbach | 261/DIG. 55 |
| 1,390,486 | 9/1921 | Black | 123/188 AF |
| 1,512,952 | 10/1924 | Secor | 123/141 |
| 1,526,963 | 2/1925 | Chandler | 123/141 |
| 1,632,196 | 6/1927 | Rhoads | 123/141 |
| 2,440,572 | 4/1948 | Brandenburg et al. | 123/188 S |
| 2,639,230 | 5/1953 | Le Febre | 123/141 X |

FOREIGN PATENTS OR APPLICATIONS

| 448,286 | 6/1936 | Great Britain | 123/141 |
| 513,439 | 11/1930 | Germany | 123/141 |
| 83,118 | 9/1956 | Switzerland | 123/188 M |

*Primary Examiner*—Wendell E. Burns
*Attorney*—Craig, Antonelli & Hill

[57] ABSTRACT

A valve chamber for the inlet valve of a four-cycle internal combustion engine in which the valve chamber is provided with at least one detaching step in proximity to the valve seat which forms a sharp edge pointing in the direction of the flow of the air to facilitate detachment of fuel precipitated along the walls.

9 Claims, 2 Drawing Figures

INVENTOR
HANS O. SCHERENBERG

BY Craig, Antonelli, Stewart & Hill
ATTORNEYS

VALVE CHAMBER FOR THE INLET VALVE OF A FOUR-CYCLE INTERNAL COMBUSTION ENGINE

The present invention relates to a valve chamber for the inlet valve of a four-cycle internal combustion engine.

Especially with cold four-cycle internal combustion engines, fuel precipitates at the walls of the inlet channel and at the walls of the valve chamber. The precipitated fuel is not detached from the walls by the combustion air flowing past the same but instead creeps or leaks due to gravity along the walls up to the valve seat from where considerable quantities continue to creep along the cylinder head wall. Since the fuel at the cylinder head wall participates only incompletely or not at all in the combustion, the mixture preparation is influenced in an unfavorable manner in the sense that larger quantities of noxious, poisonous components can be traced in the exhaust gases.

The present invention aims, for the purpose of improving the mixture preparation of the combustion and therewith of the exhaust gas composition, to take measures that fuel precipitated at the walls in the inlet channel and in the valve chamber cannot creep along the walls up to the valve seat. The underlying problems are solved in accordance with the present invention in that at least one detaching step is provided in the valve chamber in proximity to the valve seat which forms a sharp edge pointing in the direction of flow. As a result of the arrangement of a detaching step, possibly also of several detaching steps one behind the other, it is achieved with slight expenditures that the precipitated fuel is detached and torn away from the detaching step by the combustion air flowing past the same with highest velocity and is thrown together with the combustion air into the cylinder or at least against the hot inlet valve. The precipitated fuel, in a manner favorable for the mixture preparation, will thus be combusted either air-distributed or evaporated. The exhaust gas includes therefore fewer poisonous components.

In an advantageous type of construction of the present invention, the detaching step may be undercut at an angle of about 45° and the diameter of the valve chamber downstream of the detaching step may be larger by about 5 percent than the diameter of the valve chamber upstream of the detaching step.

Insofar as a valve seat is provided for the inlet valve, the detaching step may also be arranged at the valve seat, preferably at half the height of the valve seat ring.

Accordingly, it is an object of the present invention to provide a valve chamber for the inlet valve of a four-cycle internal combustion engine which eliminates by simple means the aforementioned shortcomings and drawbacks encountered in the prior art.

Another object of the present invention resides in a valve chamber for the inlet valve of a four-cycle internal combustion engine which improves the mixture preparation and therewith reduces the harmful and poisonous components in the exhaust gases.

A further object of the present invention resides in a valve chamber which minimizes the leakage of precipitated fuel to the cylinder head walls of the combustion chamber.

Figure 2:
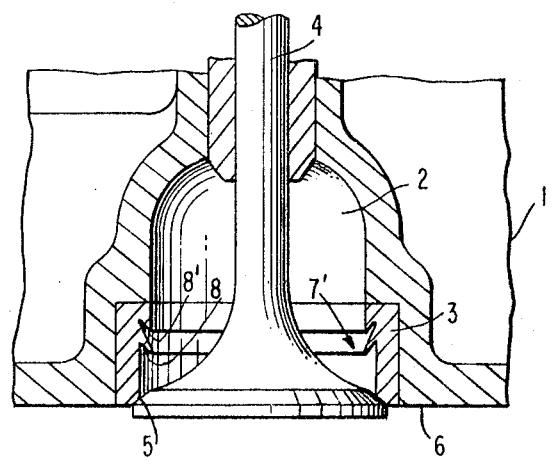

These and further objects, features, and advantages of the present invention will become more obvious from the following description when taken in connection with the accompanying drawing which shows, for purposes of illustration only, one embodiment in accordance with the present invention, and wherein:

FIG. 1 is a partial cross-sectional view through a cylinder of a four-cycle internal combustion engine provided with a valve chamber in accordance with the present invention, and FIG. 2 is a partial cross-sectional view through a cylinder of a four-cycle internal combustion engine provided with a modified valve chamber in accordance with the present invention.

Referring now to the drawing wherein like reference numerals are used throughout the two views to designate like parts, reference numeral 1 designates a cylinder head of a conventional four-cycle internal combustion engine (not shown). The valve chamber 2 with the valve seat ring 3 for the inlet valve 4 is provided in the cylinder head 1 adjoining the inlet channel (not shown).

In order to avoid that fuel precipitated with a cold internal combustion engine, at the walls of the inlet channel and at the walls of the valve chamber 2 is able to move due to gravitational forces along the valve seat 5 up to the walls 6 of the cylinder head closing off the combustion space, the detaching step generally designated by reference numeral 7 is arranged at half the height of the valve seat ring 3. The detaching step 7, provided with a sharp edge 8 pointing in the direction of flow of the combustion air, is formed in that the valve seat ring 3 is offset from the diameter of the valve chamber to a slightly larger diameter and the offset place is constituted undercut by an angle of 45°.

The combustion air flowing past the detaching step 7 with high velocity tears off from the sharp edge 8 any fuel that has leaked along the walls up to the sharp edge 8 and either takes along the fuel air-distributed to the inside of the combustion space or throws the same against the inlet valve, from where it is evaporated and reaches the cylinder in vapor form.

FIG. 2 shows a modified embodiment of the cylinder head in accordance with the present invention, provided with a valve chamber 2 in which a detaching step generally designated by reference numeral 7' is arranged at the valve seat ring 3, whereby the steps are formed by the sharp edges 8 and 8' thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all those changes and modifications as are within the scope of those skilled in the art.

What is claimed is:

1. A valve chamber formed about a valve stem of a suspended inlet valve of a four-cycle internal combustion engine, characterized in that at least one detaching step means is provided in the valve chamber in proximity to the valve seat, which is substantially concentric to the valve stem and forms within said valve chamber a sharp edge pointing substantially in the flow direction.

2. A valve chamber according to claim 1, characterized in that the detaching step means is undercut by an angle of about 45° and that the diameter of the valve chamber downstream of the detaching step means is larger by about 5 percent than the diameter of the valve chamber upstream of the detaching step means.

3. A valve chamber according to claim 2, with an inserted valve seat ring, characterized in that the detaching step means is arranged at the valve seat ring.

4. A valve chamber according to claim 3, characterized in that the detaching step means is arranged at about half the height of the valve seat ring.

5. A valve chamber according to claim 4, characterized in that several detaching step means are arranged in series in the valve chamber.

6. A valve chamber according to claim 1, with an inserted valve seat ring, characterized in that the detaching step means is arranged at the valve seat ring.

7. A valve chamber according to claim 6, characterized in that the detaching step means is arranged at about half the height of the valve seat ring.

8. A valve chamber according to claim 1, characterized in that several detaching step means are arranged in series in the valve chamber.

9. A valve chamber according to claim 1, characterized in that the detaching step means is arranged at about half the height of the valve seat ring.

* * * * *